United States Patent
Bush et al.

(10) Patent No.: US 8,271,263 B2
(45) Date of Patent: Sep. 18, 2012

(54) MULTI-LANGUAGE TEXT FRAGMENT TRANSCODING AND FEATURIZATION

(75) Inventors: Brian O. Bush, Beaverton, OR (US); Andrew J. Ross, Portland, OR (US)

(73) Assignee: Symantec Corporation, Mountain View, CA (US)

( * ) Notice: Subject to any disclaimer, the term of this patent is extended or adjusted under 35 U.S.C. 154(b) by 1096 days.

(21) Appl. No.: 12/058,582

(22) Filed: Mar. 28, 2008

(65) Prior Publication Data

US 2008/0243490 A1 Oct. 2, 2008

Related U.S. Application Data

(60) Provisional application No. 60/909,374, filed on Mar. 30, 2007.

(51) Int. Cl.
*G06F 17/28* (2006.01)

(52) U.S. Cl. ............ 704/5; 704/7; 704/8; 704/9; 704/10

(58) Field of Classification Search ........................ None
See application file for complete search history.

(56) References Cited

U.S. PATENT DOCUMENTS

| | | | |
|---|---|---|---|
| 6,970,602 B1 * | 11/2005 | Smith et al. | 382/232 |
| 7,194,506 B1 * | 3/2007 | White et al. | 709/203 |
| 2001/0047429 A1 * | 11/2001 | Seng et al. | 709/245 |
| 2003/0018668 A1 | 1/2003 | Britton et al. | |
| 2003/0041110 A1 * | 2/2003 | Wenocur et al. | 709/206 |
| 2004/0044791 A1 * | 3/2004 | Pouzzner | 709/245 |
| 2004/0215647 A1 * | 10/2004 | Farn et al. | 707/101 |
| 2004/0266462 A1 * | 12/2004 | Chava et al. | 455/466 |
| 2006/0026588 A1 * | 2/2006 | Illowsky et al. | 717/171 |
| 2006/0136309 A1 * | 6/2006 | Horn et al. | 705/26 |
| 2006/0284745 A1 * | 12/2006 | Cameron | 341/50 |

OTHER PUBLICATIONS

Masahiro Hod et al., "Annotation-Based Web Content Transcoding", WWW9 Conference, http://www9.org/w9cdrom/169/169.html, May 15-19, 2000.

J. Thrasher, "Transcoding Technology in WebSphere Everyplace Access", IBM WebSphere Developer Technical Journal, Sep. 11, 2002.

* cited by examiner

*Primary Examiner* — Leonard Saint Cyr
(74) *Attorney, Agent, or Firm* — McKay and Hodgson, LLP; Serge J. Hodgson; Sean P. Lewis

(57) ABSTRACT

Embodiments of the present invention provide methods and apparatus for transcoding received text fragments and documents. A featurization configuration is produced to create token components for evaluating the content of the text fragment. Other embodiments may be described and claimed.

26 Claims, 3 Drawing Sheets

Table 1: Character Classes and their UCS range(s) in hexadecimal

[1] Latin: 0042-005A, 0062-007A, 00C1-00D6, 00D8-00F6, 00F8-0241, 0251-02AF, 0364-036F, 1D01-1D25, 1D63-1D65, 1D6C-1D77, 1D79-1D9A, 1E01-1E9B, 1EA1-1EF9, 2091-2094, 249D-24E9, FB01-FB06, FF22-FF3A, FF42-FF5A

[2] Cyrillic: 0401-0481, 048B-04CE, 04D0-04F9, 0501-050F

[3] CJK*: 2E81-2E99, 2E9B-2EF3, 31C1-31CF, 3401-9FA5, F901-FA2D, FA31-FA6A, FA71-FAD9

[4] Katakana: 309A-309C, 30A1-30FA, 30FC-30FF, 31F1-31FF, 32D1-32FE, FF66-FF9F

[5] Hiragana: 3042-3096

[6] Arabic: 0622-063A, 0642-064A, 066F-06D3, 06D5-06D7, 06EF, 06FB-06FC, 0751-076D, FB51-FBB1, FBD4-FD3D, FD51-FD8F, FD93-FDC7, FDF1-FDFB, FDFD, FE81-FEFC

[7] Hangul: 1101-1159, 1160-11A2, 11A9-11F9, 302F, 3132-318E, 3201-321C, 3261-327B, AC01-D7A3, FFA1-FFBE, FFC3-FFC7, FFCB-FFCF, FFD3-FFD7, FFDB-FFDC

[8] Punctuation: 0022, 003B

[9] Digits: 0031-0039

* Chinese Characters used in Chinese, Japanese and Korean

** If a symbol does not belong to any of the classes listed above, it is considered to have no class.

Figure 2

MULTI-LANGUAGE TEXT FRAGMENT TRANSCODING AND FEATURIZATION

CROSS REFERENCE TO RELATED APPLICATIONS

The present application claims priority to U.S. Patent Application No. 60/909,374, filed Mar. 30, 2007, entitled "A Fast, Multi-Language Transcoding and Featurization Engine," the entire specification of which is hereby incorporated by reference in its entirety for all purposes, except for those sections, if any, that are inconsistent with this specification.

TECHNICAL FIELD

Embodiments of the present invention relate to the field of data processing, and more particularly, to transcoding and featurization of text fragments having particular application to classification of text fragments, especially in a bandwidth constrained communication environment, e.g. wireless communication.

BACKGROUND

Wireless communication systems are experiencing an explosive growth in popularity. This increase in popularity has led to a wider utilization of text messaging services whereby text fragments are exchanged between users. Text messages or text fragments may include any type of content ranging from a simple note to a message containing inappropriate content. Furthermore, the inappropriate content may be incorporated directly into the text message itself, or it may be in a more innocuous form, such as a web address where inappropriate content may be found. These text messages, however, often contain very little content, especially when the message is primarily a Uniform Resource Locator ("URL"). In such situations, it is extremely difficult to classify the content of the message. Without such classifications, filtering mechanisms may fail to accurately shield individuals from unwanted or inappropriate material. Further, there are many different languages and encodings for documents, thereby making recognizing the content of a document even more difficult.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 2 is a table listing character classes for Unicode;

DETAILED DESCRIPTION OF EMBODIMENTS OF THE INVENTION

Figure 1:
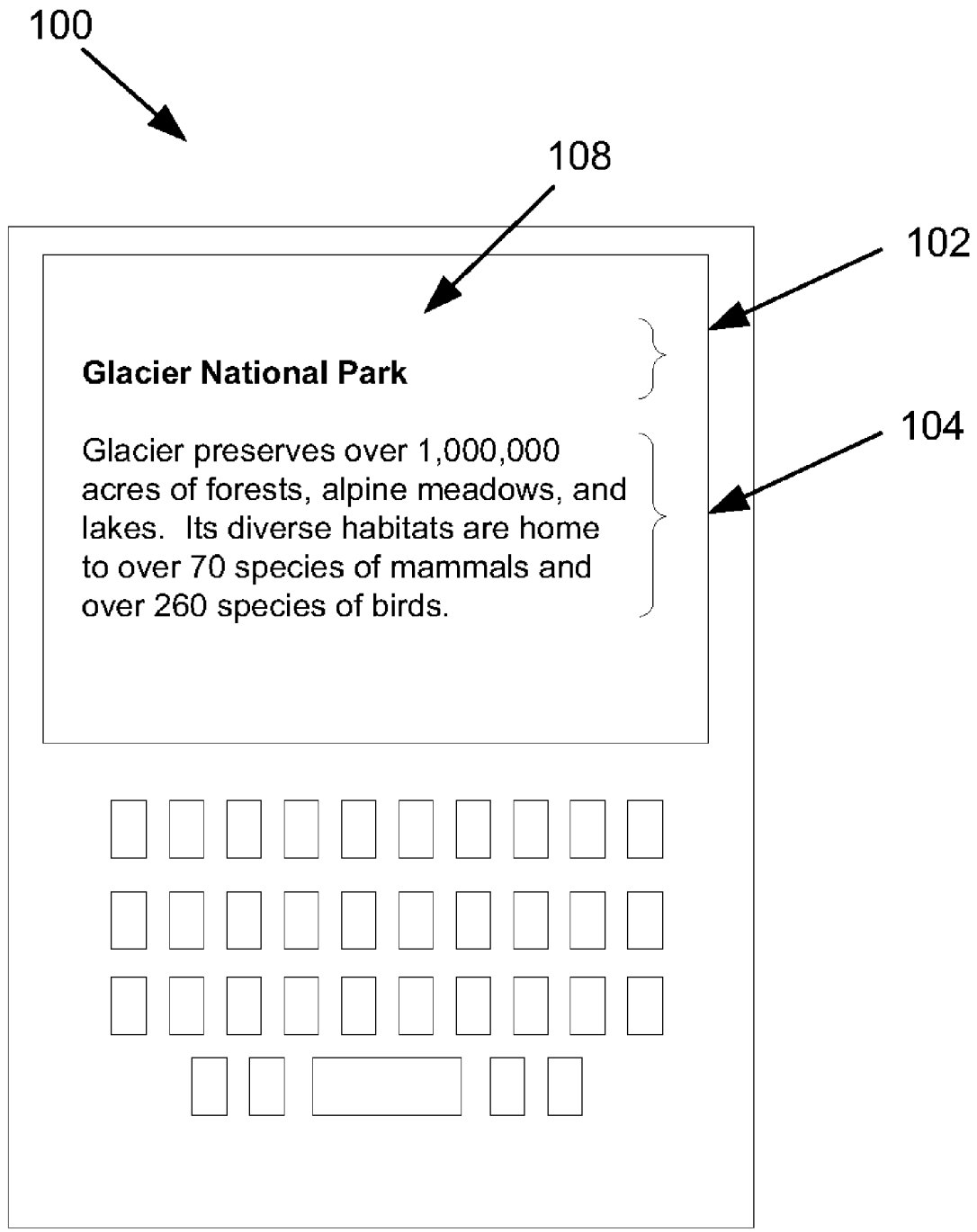
FIG. 1 illustrates an example embodiment of a host device for receiving and featurization of text fragments in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In various embodiments of the present invention, methods, apparatuses, and systems to facilitate the transcoding and featurization of documents and text are provided. The featurization may be utilized to generate feature sets that are capable of classification. Such a classification, for example, may notify a user that the text fragment contains inappropriate material, or conversely, no inappropriate material. As used herein, the term "document" refers to whole or partial documents, including, but not limited to, text messages and text fragments generally sent via wireless communication devices. The inventive techniques thus may be implemented in any device suitably configured for receiving documents including but not limited to: cellular devices, smart phones, personal digital assistants ("PDAs"), personal computers, and other networked devices. The invention is not to be limited in this regard.

Accurate classification of arbitrary documents depends primarily on proper transcoding, feature discovery and extraction. If a range of documents are all in the same language and in a single encoding, the exercise is more straightforward and simpler to implement. However, there are numerous documents available on networks, such as, for example, the Internet, that are written in a variety of languages and may be represented in numerous encodings.

Referring now to FIG. 1, a diagram of an exemplary host device capable of performing transcoding and/or featurization, in accordance with various embodiments of the present invention, is illustrated. FIG. 1 includes a host device 100 and a text fragment 108 (shown rendered on a display of host device 100). In the illustrated embodiment, the host device 100 may be any device suitably configured for receiving documents, wirelessly or via a wired line, including text fragment 108. In particular, host device 100 may be dimensioned and configured for portable or mobile usage, such as a mobile phone, a personal digital assistant and so forth. The text fragment 108, in the illustrated embodiment, is a document having a layout structure that includes a title 102 and a body of text 104. As will be readily apparent from the description to follow, text fragment 108, as illustrated in FIG. 1, is merely an example and may also be organized in other manners.

In accordance with various embodiments, the source encoding the text fragment 108 is presumed known or determinable, e.g. from headers in transmission packets employed to transmit the document, such as the HyperText Transfer Protocol ("HTTP") headers or from metadata associated with the content of the document itself. In some circumstances, automatic detection of the proper encoding(s) may be performed based on content (e.g. by recognizing specific encoded values in the document) or context. For example, Japanese language documents without explicit encodings are almost always in Shift-JIS.

Document transcoding is responsible for converting an input document into a unified representation that is as free of "meaningless distinction" as possible, if the input document is not encoded in accordance with the unified representation. The goal is that all, or nearly all, detectable ways to encode the same content are merged into a single representation by a transcoder of the present invention. The unified or single representation may also be referred to as the targeted representation. Unicode is an example of a uniform standard that unites text and symbols from virtually all of the writing forms of the world into a unified representation such that many or all possible forms of text and symbols are represented in a common character space. Examples of Unicode include UTF-8 and UTF-16.

In accordance with various embodiments, the transcoder is configured to perform a single pass on the input data is performed, inspecting a single input character at a time. Thus, there is no requirement, or virtually no requirement, for temporary storage beyond an output buffer. The output buffer may be pre-sized before transcoding by calculating a maximum size as the product of the maximum character length in the target encoding and a byte-valued length of the input buffer. Operationally, the process may flow as follows:

```
// decode_char( ) decodes and returns the next character as a
//     Unicode character value, and modifies index to
//     point to the beginning of the next character.
// encode_char( ) appends the character to the output buffer
// meta_encode( ) returns the meta-encoded character beginning at
//     index (or simply the character), and modifies
//     index to skip over it.
FOR index = 0 TO size(input_buffer)
   char = decode_char(input_buffer, index)
   char = meta_encode(char, input_buffer, index)
   char = semantic_unify(char)
   encode_char(char, output_buffer)
```

The meta_encode( ) and semantic_unification( ) operations will be discussed more fully herein. In accordance with various embodiments, the decode_char( ) routine converts a single character from the document's known input encoding (for example, ISO-8859_1) into a Unicode character value.

In accordance with various embodiments of the present invention, the process may handle a super set of legal encoded characters. For example, it may handle "extra precision" representations of UTF-8 characters (e.g. encoding an ASCII value using two bytes) that are disallowed by the strict standard. Where possible, the process may be configured to recognize more than one encoding of an input document to handle the case where, for example, data in one encoding is embedded accidentally in a document in a different encoding. This happens often in practice, for example when "smart quotes" and other word processor output appear in HyperText Markup Language ("HTML") files marked as being in an 8 bit encoding, or when a mix of UTF-8 and Shift-JIS data appears in a webpage without an explicit encoding indication.

In accordance with various embodiments of the present invention, meta-encoding is detected. Many input formats define a "meta encoding" syntax for declaring characters in ways that do not match their Unicode character values. For example, HTML and Extensible Markup Language ("XML") allow the string "&" to represent the ampersand, and more generally the numeric entity syntax '&#nnn;' to represent arbitrary Unicode codepoints. In accordance with various embodiments, these representations are detected inline (i.e. during transcoding, not as a separate pass over the data) by the transcoding engine and automatically converted to the proper representation before being passed to the semantic unification operation, discussed more fully herein.

In accordance with various embodiments, depending on context, not all possible meta-encoded values may be converted. For example, in HTML contexts, the output characters '<' and '>' (among others) are used by the language to indicate markup structure and must not be exposed to a parser for that language. In such circumstances, the transcoder performing a method of the present invention may be configured to let the markup version pass through, in effect making the meta-encoded version the "unified" representation of those characters. Other examples of meta-encoded data might include subculture-specific multi-byte representations of common characters, such as "ΛΛ" for "M."

Not all Unicode values are semantically distinct. In accordance with various embodiments of the present invention, semantically indistinct Unicode values may be represented as the same character. The mapping of each input character to its unified equivalent is termed "semantic unification." Semantic mappings during the semantic unification operation include, but are not limited to: mapping of "upper case" Latin, Cyrillic, Coptic, Armenian, Georgian, Glagolitic, Deseret and Greek characters to their lower case equivalents according to standardized case mapping algorithms; Japanese "full width" ASCII characters in the Unicode range FF01-FF5F may be mapped to their corresponding ASCII values; Japanese "half width" punctuation and katakana glyphs in the Unicode range FF61-FF9D may be mapped to their corresponding standard width representations; and Korean "half width" Hangul glyphs in the Unicode range FFA0-FFDC are mapped to their corresponding standard width representations.

In accordance with various embodiments, the process is also applicable to other, potentially regime-dependent applications of semantic unification. Examples might include "Case-like" transformation of internationalized alphabets. For example, Arabic glyphs have four forms distinguished only by their position in a word. These may be unified to a single alphabet for the purpose of semantic analysis. Also, "Alphabet-like" glyph transformations in some slang subcultures. For example, depending on context, the string "133+" might be better analyzed as "leet."

In accordance with various embodiments, during processing of a document, semantic unification may be achieved with a simple runtime table for performance. This table may be defined recursively such that if a unification mapping exists from a codepoint "A" to a codepoint "B", and from codepoint "B" to a codepoint "C", the resulting table entry maps "A" directly to "C" during processing. The generation of this mapping table, operationally, may flow as follows:

```
//  unification_mapping is an associative storing individual
//  semantic mappings (e.g. case folding, etc...) for each
//  codepoint in the input set. Not all codepoints have mappings.
//
//  output_table stores the final "unification" mapping for each
//  codepoint to its final unified value.
//
// Note detection and breaking of cycles in the input mapping data.
FOR EACH start_codepoint in all_codepoints:
    codepoint := start_codepoint
    WHILE EXISTS unification_mapping [codepoint]
        codepoint := unification_mapping[codepoint]
        IF codepoint = start_codepoint:
            BREAK
    semantic_unification_table[start_codepoint] := codepoint
```

In accordance with various embodiments of the present invention, once the encoded document has been transcoded into, for example, Unicode, the process creates a featurization configuration of the transcoded document. The transcoding generally results in all or almost all HTML mark-up having been stripped, along with other extraneous non-text information. The primary goal of featurization is to produce individual tokens from text.

Since Unicode is a uniform standard that unites text and symbols from all of the writing forms of the world, all possible forms of text and symbols are represented in a common character space. In accordance with the present invention, this common character space is segmented into multiple classes during featurization, for example, nine classes for some embodiments. FIG. 2 illustrates Table 1, which provides an example of nine classes for use in some embodiments. The featurization module scans until a class boundary is found or until the end of the text segment. The discovered segment is then filtered based on class, byte length, and/or string length. Then the process either emits the feature (or continue), and process the next feature.

In accordance with various embodiments, the featurization process produces a stream of tokens, each composed of the following: 1. Token—token text (UTF-8 encoded); 2. Size—size of token (in bytes); 3. Class—character class (listed in FIG. 2); and 4. Coincidence—a boolean flag indicating coincidence to prior token with valid class (generally only with Latin and Cyrillic classes).

In accordance with various embodiments, the default featurization configuration does not emit tokens that are less than a predetermined minimum size or larger than a predetermined size, e.g., Latin tokens of length less than three and greater than 12 are removed from the output token stream. The filtering is configurable on a per class basis.

As an example, consider the following text fragment:
"The quick red fox jumped over the white fence."
Using the featurization function, the following features are found:

| Coincident | Token | Class |
|---|---|---|
| 0 | the | Latin |
| 1 | quick | Latin |
| 1 | red | Latin |
| 1 | fox | Latin |
| 1 | jumped | Latin |
| 1 | over | Latin |
| 1 | the | Latin |
| 1 | white | Latin |
| 1 | fence | Latin |

The first column specifies whether or not the specific feature is coincident with prior features. The token text is the actual feature found, and the class column specifies which token class. The token text is listed as a unigram but may also be listed as bigrams (pairs). In such an embodiment, the tokens would be listed as (the quick) (quick red) (red fox) (fox jumped) (jumped over) (over the) (the white) (white fence).

Thus, in accordance with various embodiments of the present invention, the transcoding and featurization may be utilized to generate feature sets that are capable of classification. Such a classification, for example, may notify a user that the text fragment contains inappropriate material, or conversely, no inappropriate material.

Figure 3:
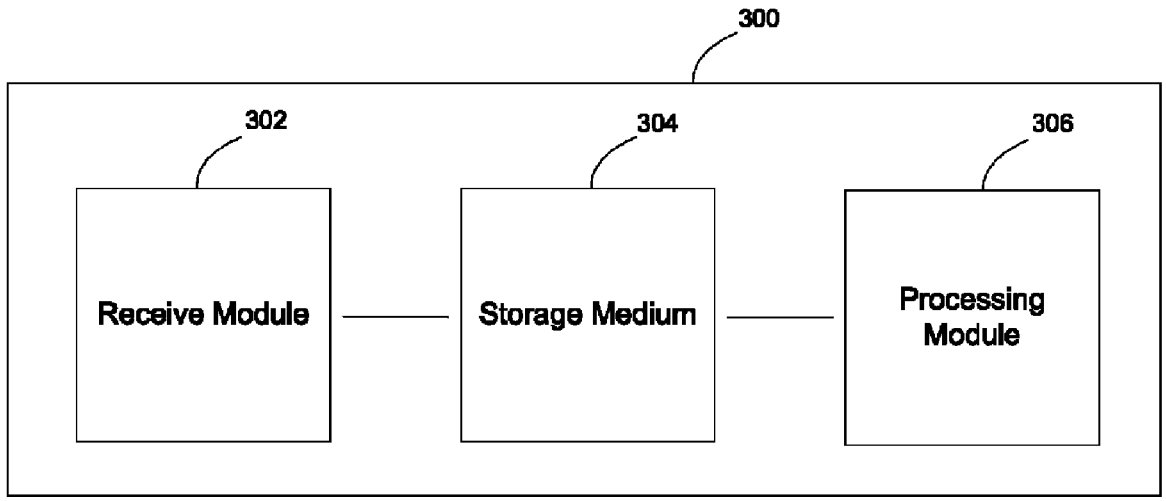
FIG. 3 illustrates a block diagram of an exemplary device capable of receiving and featurization of text fragments, in accordance with various embodiments of the present invention.

Referring now to FIG. 3, a simplified block diagram of an exemplary arrangement, housed within a host device 300, capable of transcoding and featurization, in accordance with various embodiments of the present invention, is illustrated. In one embodiment, a receive module 302 functions to allow host device 300 to receive documents and/or text fragments in either a wireless or a wired configuration. In various embodiments the text fragments may be a document received wirelessly, e.g. a Short Message Service ("SMS") message, a chat message, a Uniform Resource Locator ("URL"), and/or any other form of wirelessly or wired received text. The receive module 302 may perform one or more of, for example, signal demodulation, filtering, analog to digital conversion, decompression and/or decryption. A storage medium 304 is operatively coupled to the receive module 302 and functions to store a plurality of programming instructions that enable the host to transcode some or all of the documents and text fragments, and to produce featurization configurations. The storage medium 304 may also store and hold received text. In the illustrated embodiment, the storage medium 304 is operatively coupled to a processing module 306. In accordance with various embodiments, the processing module 306 may act as a transcoder that transcodes part of or all of the documents and/or text fragments. The processing module 306 may also perform semantic unification and produce featurization configurations made up of tokens, as described previously. In various embodiments, the tokens may be used to facilitate classification of the text fragment. Such a classification, in various embodiments, may serve to inform a user of the host device 300 of the presence or absence of inappropriate content. In other embodiments, the classification may simply shield the user from any inappropriate content.

Figure 4:
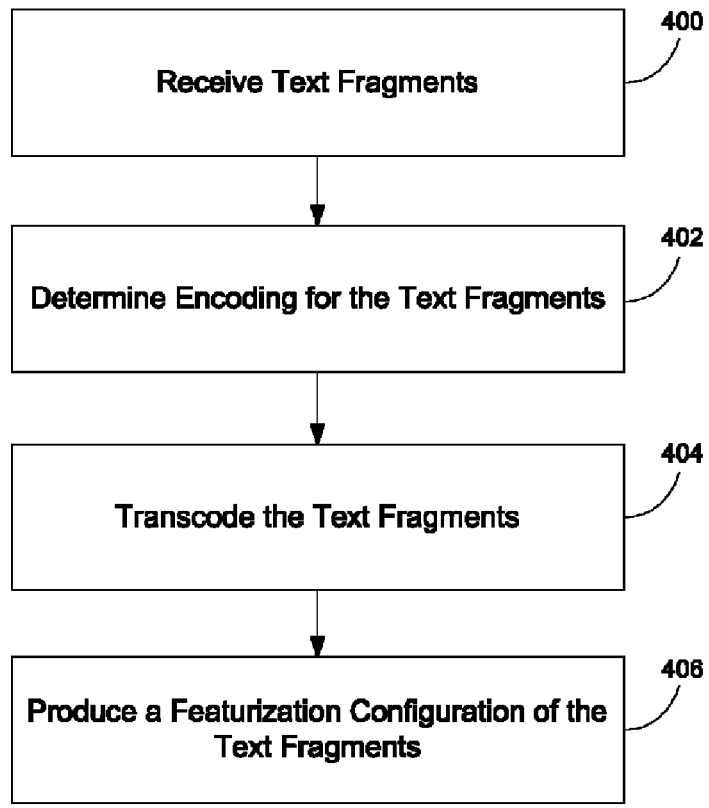
FIG. 4 illustrates a flow diagram view of a portion of the operations of a host device, in accordance with various embodiments of the present invention.

Referring to FIG. 4, a flow diagram view of a portion of the operations of a host device in accordance with various embodiments of the present invention is illustrated. In various embodiments these operations may be performed by any one of a cellular phone, mobile phone, personal digital assistant ("PDA"), and/or any other device capable of sending or receiving text messages or text fragments. In one embodiment, the host device receives a text fragment at block 400. The host device may then discern and/or determine encoding for the text fragment at block 402. At block 404, the host device may then transcode the text fragment, in view of the discerned or determined encoding. In various embodiments a featurization configuration of the text fragment may then be produced, based on the transcoded text fragment, at block 406. As alluded to earlier, semantic unification may be performed as part of transcoding and prior to featurization, and the feature sets may be employed to classify the text fragment.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
    determining a source encoding for encoded content;
    detecting at least one meta-encoded character within the encoded content, wherein a meta-encoded character has a multiple-byte source encoding representation in the source encoding;
    transcoding the encoded content into a targeted encoded content, the transcoding including converting at least one of the at least one meta-encoded characters into a single equivalent character having the same semantic meaning, and further wherein the multiple-byte meta-encoded character is a subculture-specific multicharacter representation of the single equivalent character; and
    producing a featurization configuration of the targeted encoded content, wherein the featurization configuration includes features of the targeted encoded content.

2. The method of claim 1, wherein the features of the targeted encoded content comprise token components comprised of one or more of token text, token size, character class and coincidence.

3. The method of claim 1, further comprising detecting any non-transcodeable meta-encoded content within the source encoded content and leaving the non-transcodeable meta-encoded content within the targeted encoded content.

4. The method of claim 1, further comprising
    detecting any semantically indistinct characters within the source encoded content and representing the semantically indistinct characters with the same character within the targeted encoded content.

5. The method of claim 4, wherein the representing the semantically indistinct characters with the same character within the targeted encoded content comprises mapping the semantically indistinct characters.

6. The method of claim 5, wherein mapping the semantically indistinct characters comprises mapping multiple semantically indistinct characters to a single final Unicode representation, the targeted encoded content being Unicode encoded content.

7. The method of claim 1, wherein the targeted encoded content is Unicode encoded content and the featurization configuration includes multiple classes, the classes including one or more of Latin, Cryillic, CJK, Katakana, Hiragana, Arabic, Hangul, Punctuation and/or Digits.

8. The method of claim 7, wherein producing a featurization configuration comprises scanning the targeted encoded content until a class boundary for a text segment is discovered or until an end of the text segment is reached, and then filtering the text segment based on at least one of class, byte length and/or string length.

9. The method of claim 8, wherein producing the featurization configuration comprises eliminating tokens having a size less than a predetermined number of characters and a size greater than a predetermined number of characters.

10. The method of claim 1, wherein the source encoded content is HTML encoded and said transcoding comprises stripping all HTML mark-up and other non-text information.

11. The method of claim 1, wherein the producing of a feature configuration comprises determining whether a particular feature is coincident with a prior feature.

12. An apparatus comprising:
    a receive module executing on a portable computing device, the receive module configured to receive a text fragment; and a processing module executing on the portable computing device, the processing module operatively coupled to the receive module and configured to
    determine a source encoding for encoded content,
    detect at least one meta-encoded character in the text fragment, wherein a meta-encoded character has a multiple-byte source encoding representation in the source encoding,
    transcode the encoded content into Unicode encoded content, the transcoding including converting at least one of the at least one meta-encoded characters into a single equivalent character having the same semantic meaning, and further wherein the multiple-byte meta-encoded character is a subculture-specific multicharacter representation of the single equivalent character, and
    produce a featurization configuration of the Unicode encoded content, wherein the featurization configuration includes features of the Unicode encoded content.

13. The apparatus of claim 12, wherein the processing module is further configured to detect any non-transcodeable meta-encoded content within the encoded content and leave the non-transcodeable meta-encoded content within the Unicode encoded content.

14. The apparatus of claim 12, wherein the processing module is further configured to detect any semantically indistinct characters within the encoded content and represent the semantically indistinct characters with the same Unicode character within the Unicode encoded content.

15. The apparatus of claim 14, wherein the processing module is configured to represent the semantically indistinct characters with the same Unicode character within the Unicode encoded content by mapping.

16. The apparatus of claim 15, wherein the processing module is configured to map multiple semantically indistinct characters directly to a single final Unicode representation.

17. The apparatus of claim 12, wherein a feature of the featurization configuration includes a token component comprised of one or more of token text, token size, character class and/or coincidence.

18. The apparatus of claim 12, wherein the featurization configuration includes a plurality of classes and the processing module is configured to produce the featurization configuration by scanning the Unicode encoded content until a class boundary for a text segment is discovered or until an end of the text segment is reached and to filter the text segment based on at least one of class, byte length and/or string length.

19. The apparatus of claim 18, wherein the processing module is configured to eliminate tokens having a length less than a minimum number of characters and a length greater than a maximum number of characters.

20. The apparatus of claim 12, wherein the encoded content is HTML encoded and the processing module is configured to strip all HTML mark-up during transcoding, along with other non-text information.

21. The apparatus of claim 20, wherein the coincidence of a feature represents whether a particular feature is coincident with a prior feature.

22. An article of manufacture comprising:
a nontransitory storage medium; and
a plurality of programming instructions stored on the storage medium and designed to enable a device to:
determine a source encoding for encoded content;
detect at least one meta-encoded character within the encoded content, wherein a meta-encoded character has a multiple-byte source encoding representation in the source encoding; and
transcode the encoded content into Unicode encoded content including transcoding meta-encoded content and unifying semantically indistinct encodings, the transcoding including converting at least one of the at least one meta-encoded characters into a single equivalent character having the same semantic meaning, and further wherein the multiple-byte meta-encoded character is a subculture-specific multicharacter representation of the single equivalent character.

23. The article of manufacture of claim 22, wherein the programming instructions are designed to enable the device to detect any non-transcodeable meta-encoded content within the encoded content and leave the non-transcodeable meta-encoded content within the Unicode encoded content.

24. The article of manufacture of claim 22, wherein the programming instructions are designed to enable the device to detect any semantically indistinct characters within the encoded content and represent the semantically indistinct characters with the same Unicode character within the Unicode encoded content.

25. The article of manufacture of claim 22, wherein the programming instructions are further designed to enable the device to produce featurization configuration by scanning the Unicode encoded content until a class boundary for a text segment is discovered or until an end of the text segment is reached and filtering the text segment based on at least one of class, byte length and/or string length.

26. The article of manufacture of claim 22, wherein the encoded content is HTML encoded and the programming instructions are further designed to enable the device to strip all HTML mark-up during transcoding, along with other non-text information.

* * * * *